US005920365A

United States Patent [19]

Eriksson

[11] Patent Number: 5,920,365

[45] Date of Patent: Jul. 6, 1999

[54] DISPLAY DEVICE

[75] Inventor: Sören Eriksson, Stockholm, Sweden

[73] Assignee: Touch Display Systems AB, Kista, Sweden

[21] Appl. No.: 08/808,344

[22] Filed: Feb. 28, 1997

Related U.S. Application Data

[63] Continuation-in-part of application No. PCT/SE95/00985, Sep. 1, 1995.

[30] Foreign Application Priority Data

Sep. 1, 1994 [SE] Sweden .................................. 9402911

[51] Int. Cl.$^{6}$ .................................................. G02F 1/1343

[52] U.S. Cl. .......................... 349/146; 349/142; 349/144

[58] Field of Search .............................. 349/22, 141, 142, 349/144, 146

[56] References Cited

U.S. PATENT DOCUMENTS 3,631,459 12/1971 Morris, Jr. et al. ..................... 340/336

3,781,515 12/1973 Morris, Jr. et al. ..................... 219/216

3,897,643 8/1975 Morris, Jr. et al. ..................... 340/336

FOREIGN PATENT DOCUMENTS

558134-A2 2/1993 European Pat. Off. .

4-335616 11/1992 Japan .

*Primary Examiner*—William L. Sikes

*Assistant Examiner*—Joanne Kim

*Attorney, Agent, or Firm*—Frishauf, Holtz, Goodman, Langer & Chick

[57] ABSTRACT

A display device includes a number of picture segments (2, 3) which are selectively activated (made visible) or non-activated (made non-visible). The picture segments (2, 3) are arranged to form a number of equal picture segment units (1) positioned side-by-side and each comprising a square with an inscribed geometrical figure (2), which by straight or arcuate parts define four identical corner segments (3) of the square, which picture segments are each comprised of the geometrical figure (2) and the four corner segments (3). The geometrical figure may be, for example, a circle, a square or an octagon.

16 Claims, 4 Drawing Sheets

DISPLAY DEVICE

CROSS REFERENCE TO RELATED APPLICATION

This is a Continuation-In-Part of International Application No. PCT/SE95/00985 filed Sep. 1, 1995, the entire contents of which of are incorporated herein by reference.

BACKGROUND OF THE INVENTION

The present invention relates to a device for providing a display, sign, printer head and the like, which device comprises a number of picture segments, that are selectively either activated (made visible) or non-activated (made non-visible).

A large number of variants of such devices are known for different purposes. Some of them are based on the use of picture segments consisting of LCD-elements (Liquid Crystal Display elements), which in turn are arranged to form picture segment units comprising identical or different picture segments. It has been possible to build pictures by such units, usually alpha-numeric pictures with a high or low degree of accuracy. A high degree of accuracy requires a very large number of picture segments, a large number of electrical connections and a consequently complex driving circuit. This applies especially if the picture in question also must comprise characters beyond the alpha-numeric field, for instance traffic signs. For this purpose, display screens are usually used which can be illuminated from behind by sources of light, which usually are symmetrically dispersed over a large-area sign, on which the picture should be shown. The display screens may be perpetually activated (i.e. transparent), or non-activated (i.e., non-transparent), showing the intended pattern or character. As an alternative, the display screens may be made of LCD-elements which are selectively operated to be in a transparent and non-transparent state, respectively.

The object of the invention is to provide a device of the kind described above, which by means of a small number of picture segments presents an improved readability and enables a simplified control.

SUMMARY OF THE INVENTION

This object is achieved in accordance with the invention in that the picture segments are arranged to form a number of equal picture segment units positioned side-by-side. Each picture segment unit comprises a rectangle with an inscribed geometrical figure, which by straight or arcuate parts define four identical corner segments of the rectangle. Thus, each picture segment comprises the geometrical figure and the four corner segments. The picture segments may be made of LCD-elements, which either are provided with electrical connections for activating the LCD-elements or as an alternative are of the type being activated by means of heat, for example by a guided laser beam. The picture segments may also, for certain applications, be made of display screens which can be illuminated from behind by a respective separate light source or by a light source common for several picture segments, which areas together may form large-area light signs.

Preferably, the picture segment units are square in shape.

BRIEF DESCRIPTION OF THE DRAWINGS

The invention will now be described in more detail in the following, with reference to the accompanying drawings which schematically show exemplified embodiments thereof, and in which.

DETAILED DESCRIPTION

Figure 1:
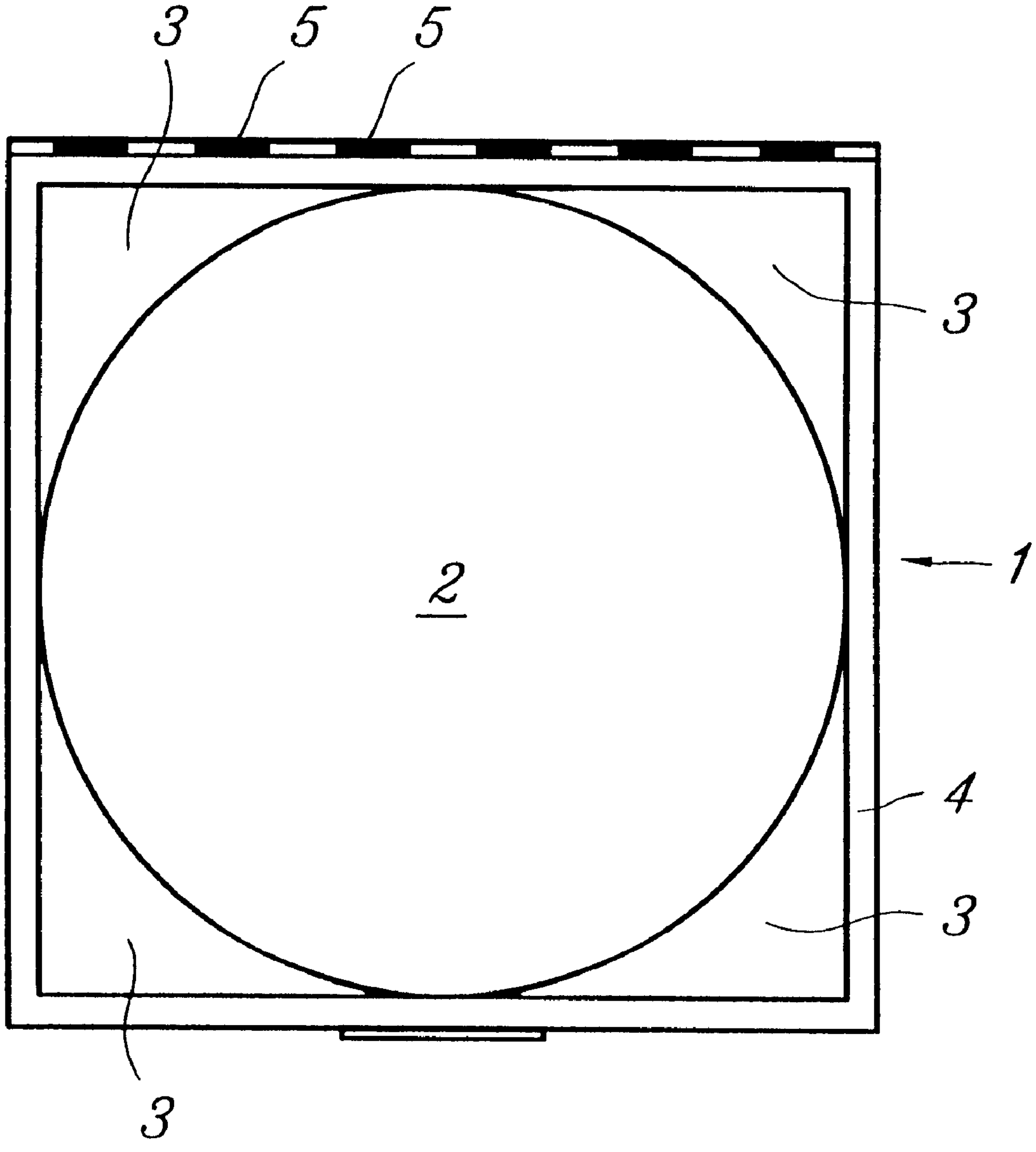
FIG. 1 is a plan view of a picture segment unit of the present invention.

FIG. 1 shows a picture segment unit 1, also called a pixel, which according to the present invention is divided into five LCD-elements or picture segments. In particular, FIG. 1 shows a circle segment 2 and four corner segments 3. The unit of FIG. 1 has the shape of a circle inscribed in a square. An oval inside of a non-square rectangle could also be used. The picture segment unit 1 is designed in a conventional way and comprises a frame 4 having an edge along which electrical connections 5 (not shown in detail) to the different picture segments 2, 3 are arranged. When combining several, for instance 5×8 pixel units (see FIG. 2), to a larger picture, the frame 4 is arranged in a conventional way around the overall picture and not around separate pixels. FIG. 1 shows six electrical connection pads 5. Five of the electrical connection pads 5 are connected to respective picture segments 2, 3 in a conventional manner (not shown) to electrically connect drive signals to the picture segments 2, 3, and the sixth electrical connection pad 5 is connected to a common electrically conductive bottom layer (not shown) which is conventional for operating such LCD picture elements.

Figure 2:
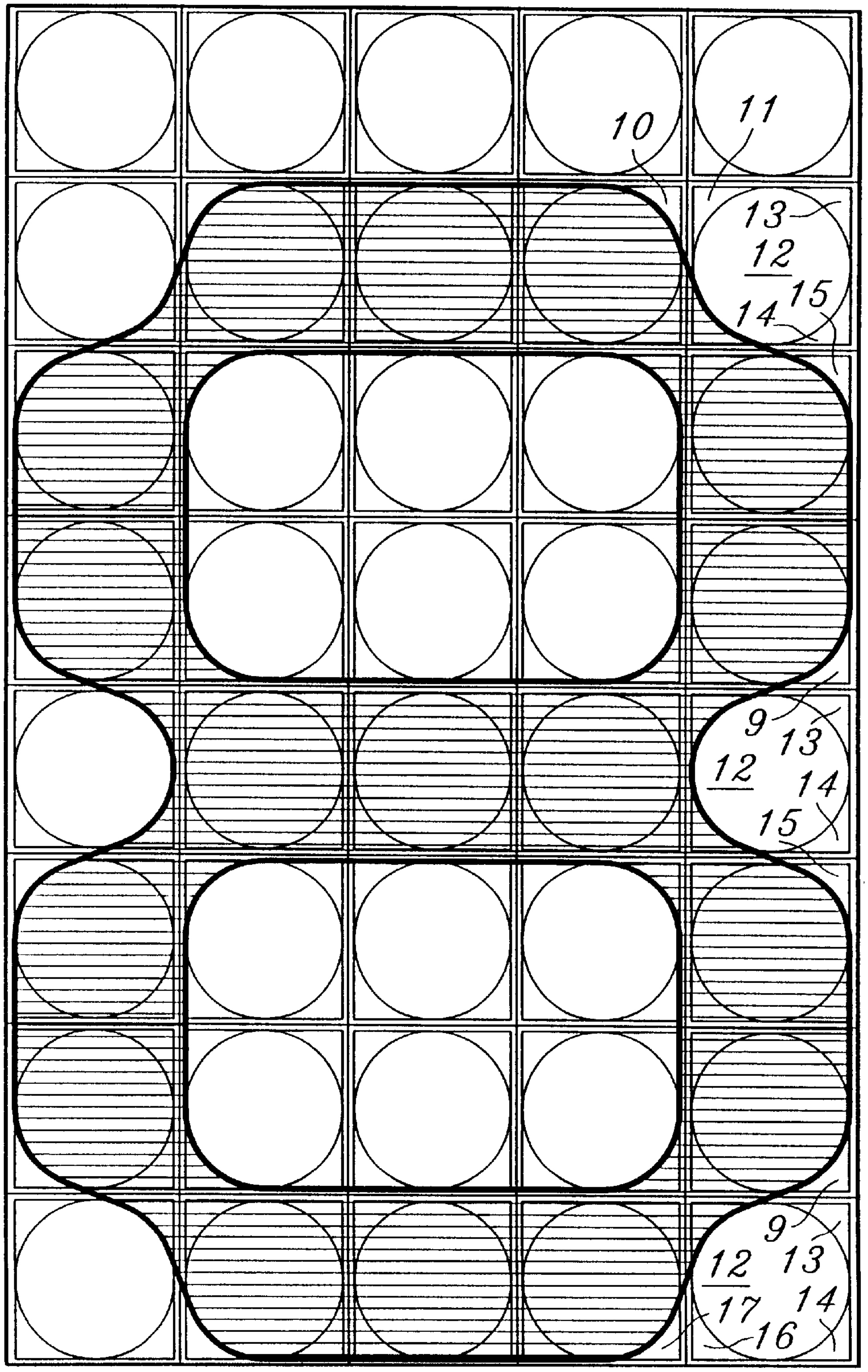
FIG. 2 is a display according to the invention made of a plurality of picture segment units, FIGS. 3 and 4 respectively show a display comprising the same device made of conventional picture segment units according to two possible designs.

FIG. 2 shows a display with 5×8 picture segment units 1 of the type shown in FIG. 1, arranged as shown in FIG. 2. FIG. 2 shows a display of a digit “8”, which comprises an area with 5×7 of the picture segment units 1 of the display. The curved parts of the device have got a shape that is particularly easy to read due to the fact that, for instance, picture segments 10–15 of three picture segment units at the upper, right hand corner of the digit, and picture segments 9, 12–15 of three picture segment units at the right hand, middle part of the digit, and picture segments 9, 12–14, 16, 17 of three picture segment units at the bottom, right hand corner of the digit, and the corresponding picture segment units at the left hand part in the drawing are made non-visible.

Figure 3:
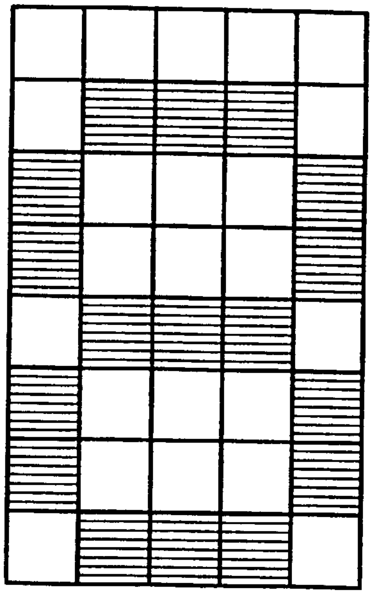
Fig. 3 (PRIOR ART)
Figure 4:
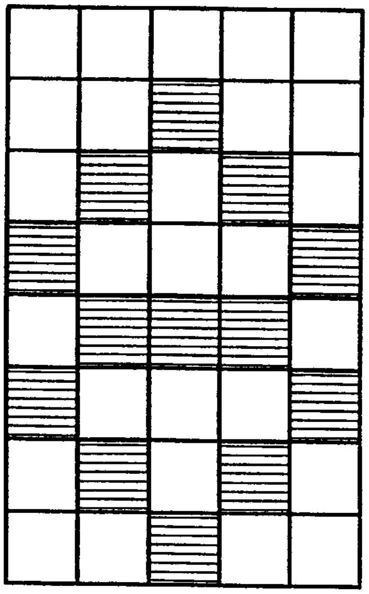
Fig. 4 (PRIOR ART)

In comparison, FIGS. 3 and 4 show the same digit “8” formed in two different possible conventional ways by square picture segment units which are not provided with the arrangement of the present invention, i.e., they are not provided with the division of the squares into the five picture segments 2,3. Accordingly, the digits shown in FIGS. 3 and 4 are very angular and difficult to read.

Figure 5:
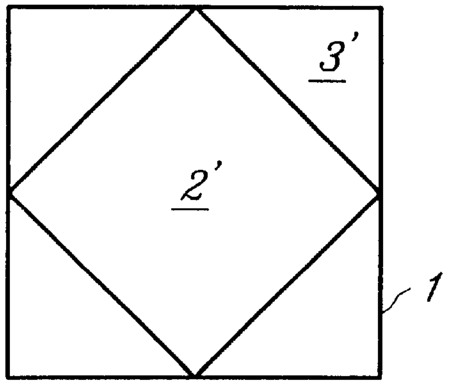
FIGS. 5 and 6 are plan views of two alternative embodiments of a picture segment unit according to the present invention.
Figure 6:
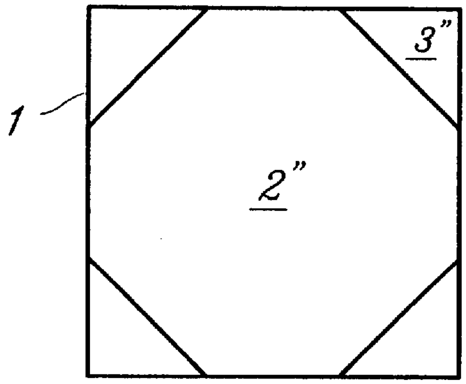

As an alternative to a picture segment unit 1 in the shape of a circle inscribed in a square (FIGS. 1 and 2), it is possible to use a tetragonal arrangement 2' or a square inscribed in a square, or an octagon 2" inscribed in a square, as shown in FIGS. 5 and 6, with corner segments 3' and 3", respectively.

Figure 7:
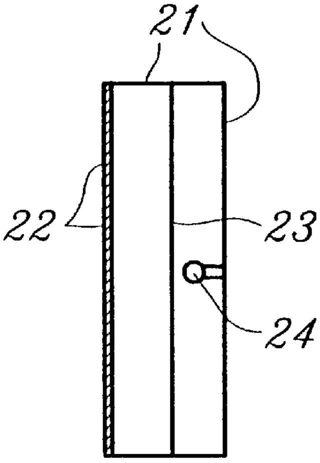
FIGS. 7, 8 and 9 are cross-sectional views of picture segment units according to three different embodiments of the present invention.
Figure 8:
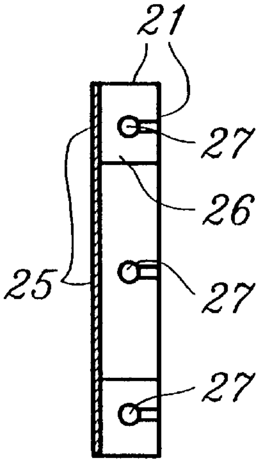
Figure 9:
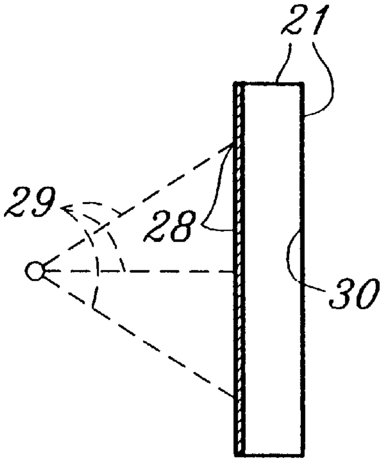

FIGS. 7–9 show greatly simplified cross-sectional views of three different devices for providing a display according to the invention.

FIG. 7 shows a casing 21 with a front face made up of LCD-elements 22 and a transparent, suitably colored rear face 23, which is illuminated from behind by a light source 24. The LCD-elements 22 may take the form shown in FIG. 2. Non-visible picture segments of the LCD-elements 22 then are clearly exposed (by virtue of the rear light source 24) even in darkness. In operation, the LCD-elements 22 are selectively made transparent or non-transparent by electrical signals applied to the electrical connection pads 5 of each picture segment unit 1 in a conventional manner. The rear lighting provided by the light source 24, through the suitably colored rear face 23, is visible through the picture segments that are electrically controlled to be transparent. The color of the display is a function of the color of the rear face 23 provided in the casing 21. In the arrangement of FIG. 7, a single light source for illuminating the entire rear of the casing is sufficient, and control of the visible and non-visible display sections is accomplished by electrically controlling the LCD-elements, for example as in FIG. 2.

FIG. 8 shows another type of casing 121 with a front face 25 made up of a number of picture segments (similar in shape to the picture segments 2, 3 of units 1 of FIGS. 1, 2, 5 or 6) made of, for example, colored or clear glass, colored or clear plastic, or the like. Behind each picture segment 25 (i.e., segments 2, 3) and separated by partition walls 26 there is a light source, for example a bulb 27. Each bulb 27 is separately electrically energized to illuminate from behind a selected respective picture segment 25 (i.e., respective segments 2, 3 of FIG. 1) to provide a visible display. In FIG. 8, the colored or clear glass or plastic picture segments replace the LCD segments of FIGS. 1 and 2. The partition walls 26 of FIG. 8 effectively isolate the respective picture segments from each other so that illumination light for one picture segment does not cause unintended illumination of the picture segments.

FIG. 9 shows an alternative arrangement without a light source and comprising a casing 221 and a front face 28 made up of LCD-elements, which LCD-elements can be activated by heat generated by a movable laser beam 29 in a manner known per se. The inside of a rear face 30 of the casing 221 may be provided with a suitable color that gives rise to a good contrasting effect between picture segments made visible and non-visible by the heat generated by the movable laser beam 29.

A printer head in accordance with the present invention will have various segments corresponding to the picture segments shown in FIGS. 1, 2, 5 and 6, for example, which are selectively activated or non-activated during printing to print the pattern corresponding to the activated and deactivated segments.

It will be understood that the invention is not restricted to the here illustrated and described embodiments but can be modified in different ways within the scope of the inventive concept defined in the claims. Hence, each picture segment unit may be of the kind where the picture segments have a memory function such that a control voltage can cease after its activating of a picture segment, after which the picture segment remains in an activated state until a new signal is supplied that deactivates the picture segment. Various other modifications may be made within the scope of the claims.

I claim:

1. A device for providing a display, sign, printer head and the like, comprising a number of picture segments (2, 3), which are selectively either activated or non-activated, wherein:

the picture segments (2,3) are arranged to form a number of equal picture segment units (1) positioned side-by-side; and each picture segment unit (1) comprises a rectangle with an inscribed geometrical figure, which by straight or arcuate parts define four identical corner segments (3) of the rectangle, whereby each picture segment unit (1) comprises the inscribed geometrical figure (2) and the four corner segments (3).

2. A device according to claim 1, wherein the picture segments (2, 3) comprise LCD-elements which are selectively activated or non-activated.

3. A device according to claim 2, further comprising electrical connections (5) coupled to respective LCD-elements (2, 3) for selectively activating the LCD-elements (2, 3).

4. A device according to claim 3, comprising:

a common light source (24) for a plurality of picture segments (2, 3) and arranged to illuminate from behind the plurality of picture segments (2, 3); and wherein respective picture segments of said plurality of picture segments are selectively made transparent such that light from said common light source (24) passes therethrough to provide a visible display.

5. A device according to claim 4, further comprising a colored member (23) interposed between said common light source (24) and said picture segments (2, 3) to provide a colored visible display.

6. A device according to claim 2, comprising:

a common light source (24) for a plurality of picture segments (2, 3) and arranged to illuminate from behind the plurality of picture segments (2, 3); and wherein respective picture segments of said plurality of picture segments are selectively made transparent such that light from said common light source (24) passes therethrough to provide a visible display.

7. A device according to claim 6, further comprising a colored member (23) interposed between said common light source (24) and said picture segments (2, 3) to provide a colored visible display.

8. A device according to claim 1, wherein the picture segments (2, 3) comprise areas which are selectively illuminated from behind by at least one light source.

9. A device according to claim 8, wherein a separate light source is provided behind each of the picture segments (2, 3) to selectively illuminate respective picture segments (2, 3).

10. A device according to claim 9, further comprising partition members (26) separating respective picture segments (2, 3) and respective light sources from each other.

11. A device according to claim 1, comprising:

a common light source (24) for a plurality of picture segments (2, 3) and arranged to illuminate from behind the plurality of picture segments (2, 3); and wherein respective picture segments of said plurality of picture segments are selectively made transparent such that light from said common light source (24) passes therethrough to provide a visible display.

12. A device according to claim 11, further comprising a colored member (23) interposed between said common light source (24) and said picture segments (2, 3) to provide a colored visible display.

13. A device according to claim 1, wherein said rectangular picture segment units (1) are square.

14. A device according to claim 13, wherein said inscribed geometrical figure is a circle.

15. A device according to claim 13, wherein said inscribed geometrical figure is a square.

16. A device according to claim 13, wherein said inscribed geometrical figure is an octagon.

* * * * *